(12) United States Patent
Lin

(10) Patent No.: US 9,851,194 B2
(45) Date of Patent: Dec. 26, 2017

(54) MEASURING APPARATUS

(71) Applicant: HON HAI PRECISION INDUSTRY CO., LTD., New Taipei (TW)

(72) Inventor: Chun-Jen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 187 days.

(21) Appl. No.: 15/011,877

(22) Filed: Feb. 1, 2016

(65) Prior Publication Data
US 2016/0349032 A1 Dec. 1, 2016

(30) Foreign Application Priority Data

May 28, 2015 (CN) .......................... 2015 2 0354790

(51) Int. Cl.
*G01B 3/16* (2006.01)
*G01B 3/56* (2006.01)
*G01B 5/12* (2006.01)
*G01B 5/14* (2006.01)

(52) U.S. Cl.
CPC ............. *G01B 3/56* (2013.01); *G01B 3/16* (2013.01); *G01B 5/12* (2013.01); *G01B 5/14* (2013.01)

(58) Field of Classification Search
CPC ... G01B 3/16; G01B 3/56; G01B 5/12; G01B 5/14
USPC .......................................... 33/534, 1 N, 1 PT
See application file for complete search history.

(56) References Cited

U.S. PATENT DOCUMENTS

| 4,513,512 A * | 4/1985 | Fischer | G01B 3/16 33/1 N |
|---|---|---|---|
| 6,334,257 B1 * | 1/2002 | Den Ouden | A61B 5/1071 33/1 N |
| 7,574,813 B1 * | 8/2009 | Boutan | E04F 21/0069 33/471 |
| 2004/0006881 A1 * | 1/2004 | Shapiro | G01B 3/56 33/471 |
| 2005/0166413 A1 * | 8/2005 | Crampton | B25J 13/088 33/503 |
| 2014/0190030 A1 * | 7/2014 | Sano | A61B 5/107 33/534 |
| 2016/0349032 A1 * | 12/2016 | Lin | G01B 3/56 |
| 2016/0363429 A1 * | 12/2016 | Clerc | G01B 3/56 |

* cited by examiner

*Primary Examiner* — Yaritza Guadalupe-McCall
(74) *Attorney, Agent, or Firm* — ScienBiziP, P.C.

(57) ABSTRACT

A measuring apparatus includes a first angle measuring member, a second angle measuring member, and a display module. The first angle measuring member includes a first connecting shaft, a first needle rotatably connected to the first connecting shaft, and a first angle measuring instrument. The second angle measuring member includes a second connecting shaft, a second needle rotatably connected to the second connecting shaft, and a second angle measuring instrument. The first angle measuring instrument is configured to measure a first angle between the first needle and the first connecting shaft, and the second angle measuring instrument is configured to measure a second angle between the second needle and the second connecting shaft. The display module is configured to calculate a size of the object based on the first angle, the second angle, and lengths of the first connecting shaft and the second connecting shaft.

11 Claims, 8 Drawing Sheets

MEASURING APPARATUS

FIELD

The subject matter herein generally relates to a measuring apparatus.

BACKGROUND

Traditionally, a vernier caliper is normally used for measuring the diameter of a tube. Two measuring claws of the vernier caliper are inserted into the tube touching the inner surface of the tube. Thus, the value of the diameter of the tube can be read from the vernier caliper.

BRIEF DESCRIPTION OF THE DRAWINGS

Implementations of the present technology will now be described, by way of example only, with reference to the attached figures.

DETAILED DESCRIPTION

Figure 1:
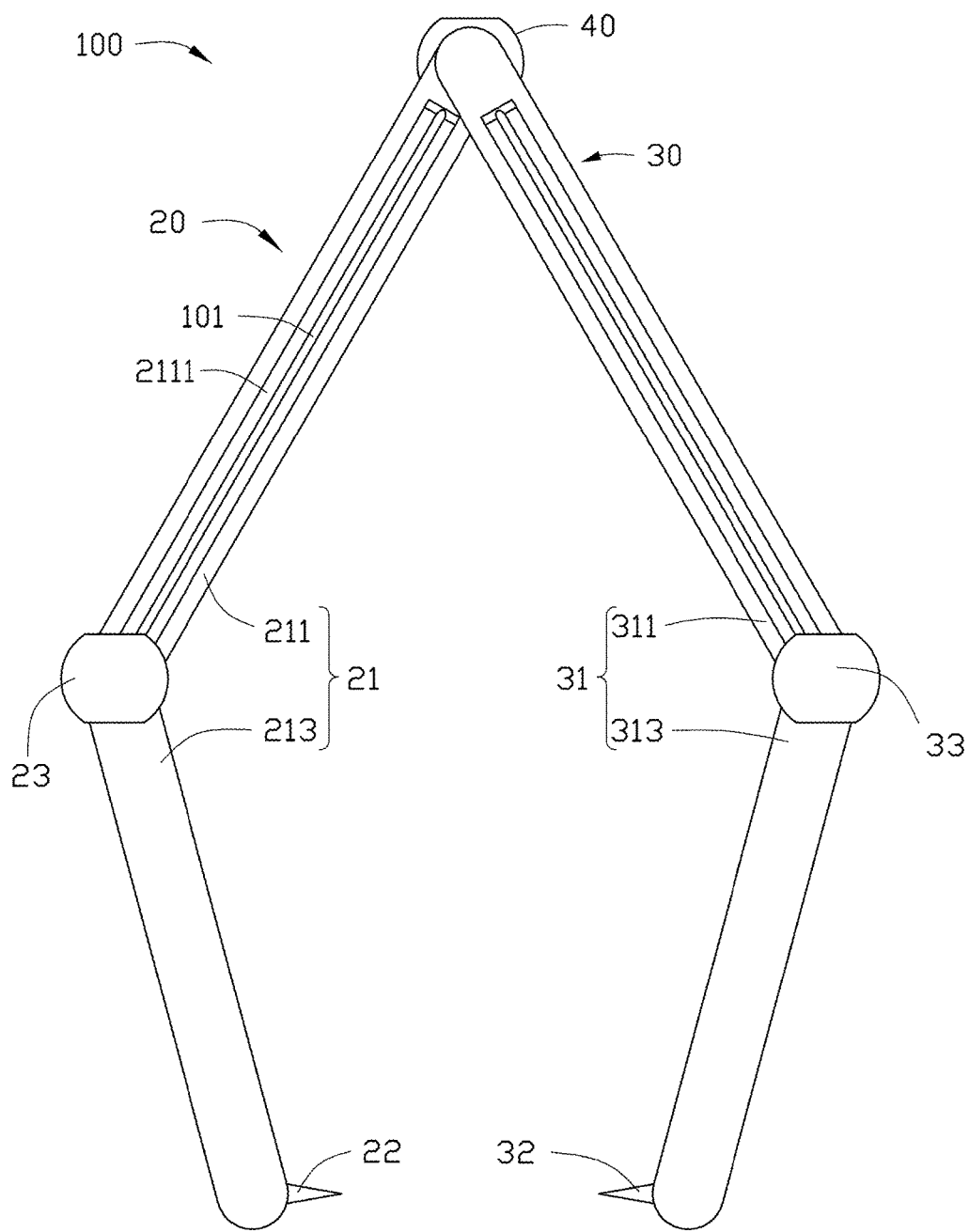
FIG. 1 is an isometric view of a first embodiment of a measuring apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series and the like.

The present disclosure is described in relation to a measuring apparatus configured to measure a size of an object, such as an internal diameter of a tube.

FIG. 1 illustrates that a measuring apparatus 100 of a first embodiment can include a first angle measuring member 20, a second angle measuring member 30, and a display module 40. The display module 40 can be mounted to the first angle measuring member 20 or the second measuring member 30. The display module 40 can be configured to display an internal diameter of the tube.

The first angle measuring member 20 can include a first connecting shaft 21, a first needle 22, and a first angle measuring instrument 23. The first needle 22 can be mounted on one end of the first connecting shaft 21 and can rotate relative to the first connecting shaft 21. The first needle 22 can be configured to contact surfaces of the object. The first angle measuring instrument 23 can be mounted on the first connecting shaft 21 and electrically connected to the display module 40 by a first electric wire 101. The first measuring instrument 23 can be configured to measure a rotary angle of the first needle 22 relative to the first connecting shaft 21.

The second angle measuring member 30 can be similar to the first angle measuring member 20. The second angle measuring member 30 can include a second connecting shaft 31, a second needle 32, and a second angle measuring instrument 33. The second needle 32 can be mounted on one end of the first connecting shaft 31 and can rotate relative to the second connecting shaft 31. The second needle 32 can be configured to contact surfaces of the object. The second angle measuring instrument 33 can be mounted on the second connecting shaft 31, and the second angle measuring instrument 33 and the second needle 32 can be electrically connected to the display module 40. The second measuring instrument 33 can be configured to measure a rotary angle of the second needle 32 relative to the second connecting shaft 31. One end of the first connecting shaft 21 away from the first needle 22 can be rotatably coupled to one end of the second connecting shaft 32 away from the second needle 32.

The first connecting shaft 21 can include a first shaft 211 and a second shaft 213 rotatably coupled to the first shaft 211. The first angle measuring instrument 23 can be mounted at the junction of the first shaft 211 and the second shaft 213. The second connecting shaft 31 can include a third shaft 311 and a fourth shaft 313 rotatably coupled to the third shaft 311. The second angle measuring instrument 33 can be mounted at the junction of the third shaft 311 and the fourth shaft 313. One end of the first shaft 211 away from the second shaft 213 can be rotatably coupled with one end of the third shaft 311 away from the fourth shaft 313. The display module 40 can be positioned at the junction of the first shaft 211 and the third shaft 311. The first needle 22 can be rotatably mounted at one end of the second shaft 213 away from the first shaft 211, and the second needle 32 can be can be rotatably mounted at one end of the fourth shaft 313 away from the third shaft 311. In at least one embodiment, the first angle measuring instrument 23 and the second angle measuring instrument 33 can be electric angle measuring instruments. The first needle 22, the second needle 32, and the display module 40 can be arranged at a same side of the first connecting shaft 21 and the second connecting shaft 31, and the first angle measuring instrument 23 and the second angle measuring instrument 33 can be arranged at another side of the first connecting shaft 21 and the second connecting shaft 31.

In an initial state, the first needle 22, the first shaft 211, and the second shaft 213 can be in a straight line, and the first needle 22 and the first connecting shaft 21 can face one way. The second needle 32, the third shaft 311, and the fourth shaft 313 can be in a straight line, and the second needle 32 and the second connecting shaft 31 can face one way. The first angle measuring instrument 23 and the second measuring instrument 33 can read zero in the initial state.

The first shaft 211 can define a first slot 2111 configured to receive the first electric wire 101. The third shaft 311 can have a same structure with the first shaft 211, and can define a slot (not shown) configured to receive an electric wire (not shown).

Figure 2:
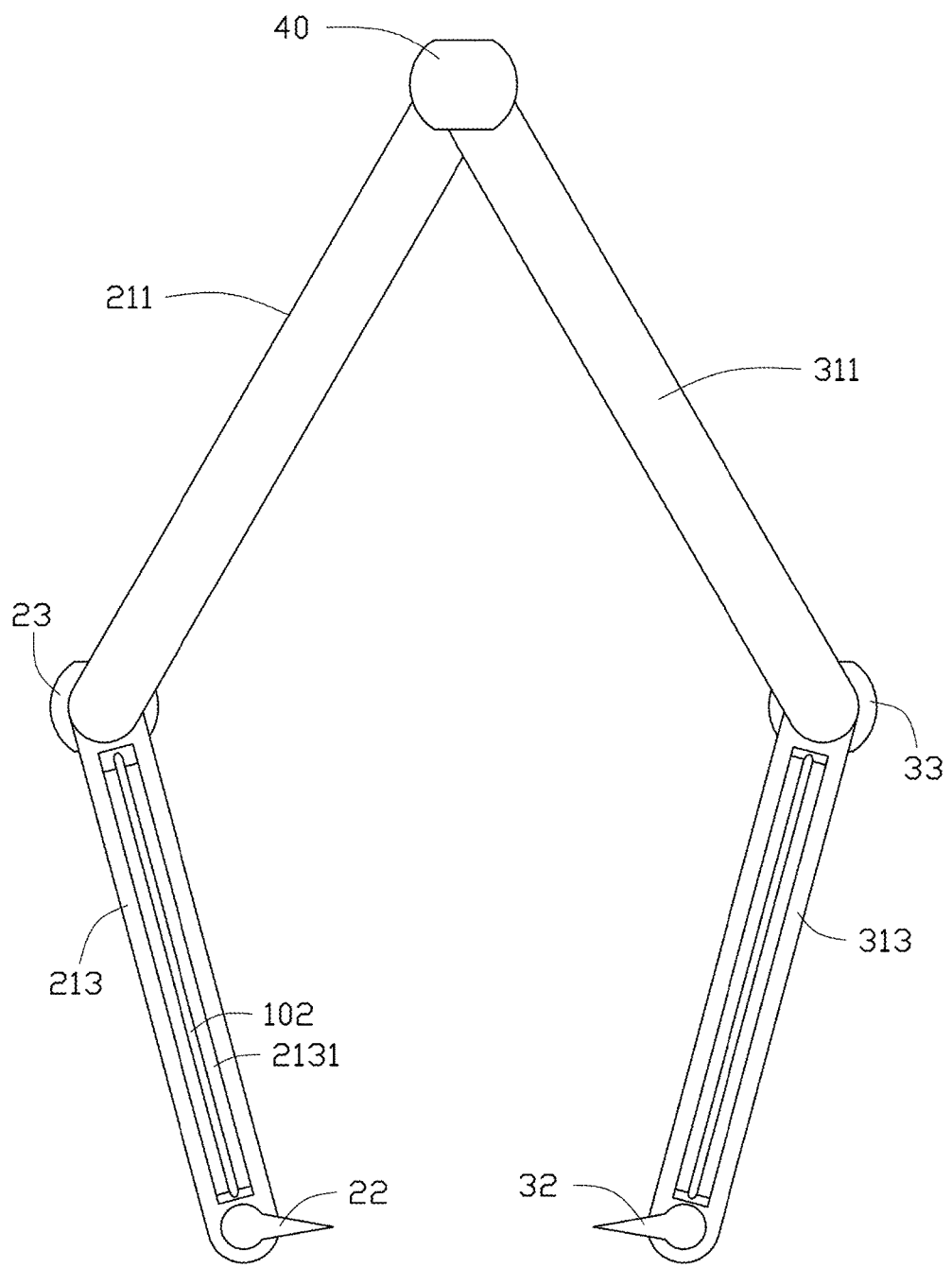
FIG. 2 is similar to FIG. 1, but viewed from another angle.

FIG. 2 illustrates that the second shaft 213 can define a second slot 2131 configured to receive a second electric wire 102. The first angle measuring instrument 23 can be electrically connected to the first needle 22 by the second electric wire 102. The fourth shaft 313 can have a same structure with the second shaft 213, and can define a slot (not shown) configured to receive an electric wire (not shown).

Figure 3:
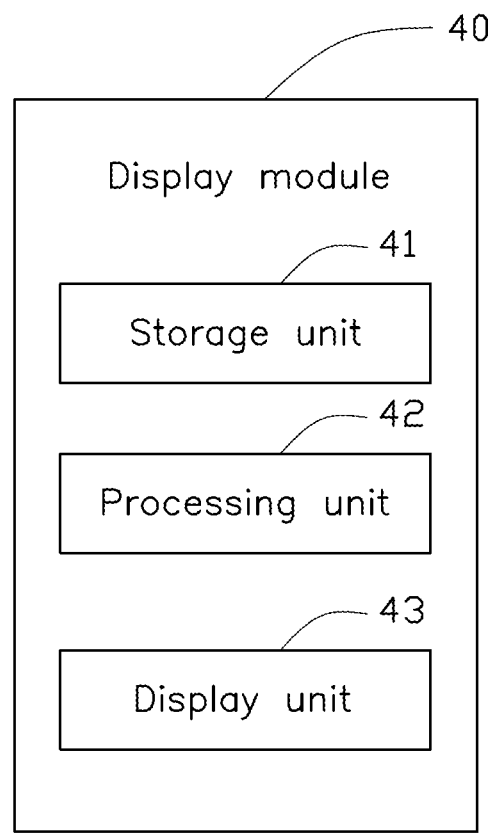
FIG. 3 is a block view of a display module of the measuring apparatus shown in FIG. 1.

FIG. 3 illustrates that the display module 40 can include a storage unit 41, a processing unit 42, and a display unit 43. The storage unit 41 and the display unit 43 can be electrically connected to the processing unit 42. The processing unit 42 can receive the angles measured by the first angle measuring instrument 23 and the second angle measuring instrument 33. In at least one embodiment, the storage unit 41 can store a length L1 of the first connecting shaft 21 and a length L2 of the second connecting shaft 31. The display unit 43 can receive the angles transmitted by the processing unit 42 and display an image of the angles. The display unit 43 can be a display screen.

Figure 4:
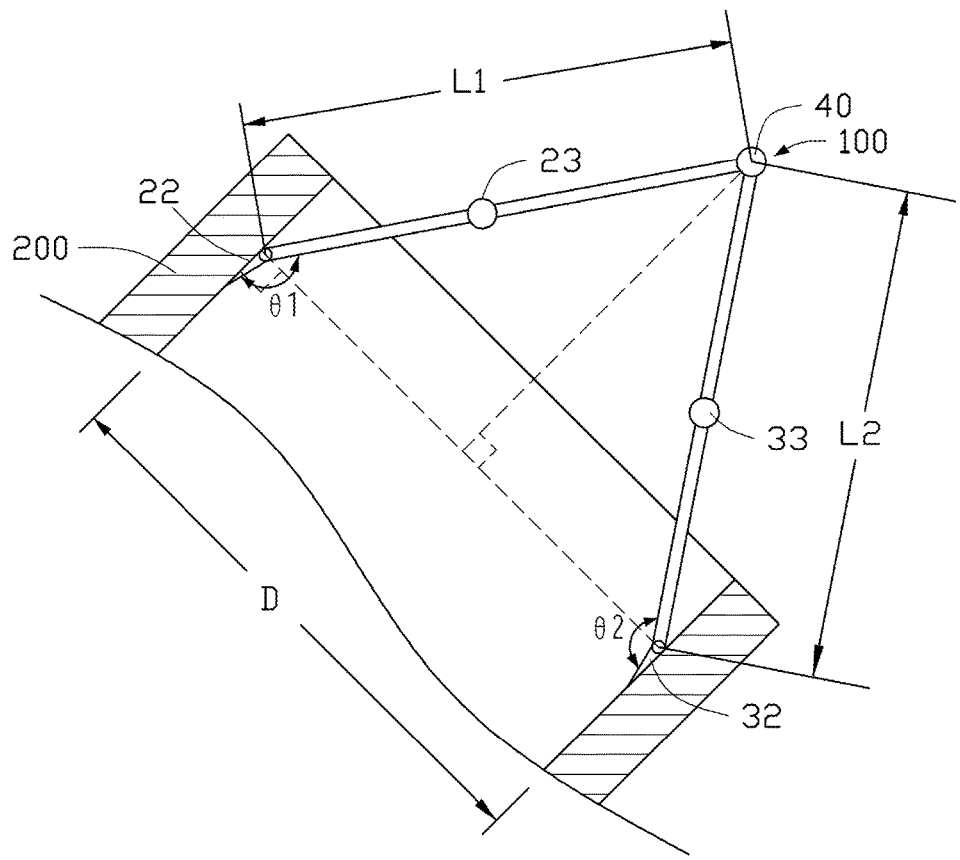
FIG. 4 is a side view of the measuring apparatus shown in FIG. 1 in a first state.

FIG. 4 illustrates that the length L1 can be a distance between two ends of the first connecting shaft 21 when the first shaft 211 and the second shaft 213 are in a straight line. The length L2 can be a distance between two ends of the second connecting shaft 31 when the third shaft 311 and the fourth shaft 313 are in a straight line. In at least one embodiment, the measuring apparatus 100 can be configured to measure an internal diameter D of the tube 200. Two inner walls of the tube 200 of same section can be parallel to each other.

In measuring the tube 200, the second shaft 213 and the fourth shaft 313 can be rotated, thereby the second shaft 213 and the first shaft 211 can be in a straight line, and the fourth shaft 313 and the third shaft 311 can be in a straight line. The first needle 22 and the second needle 32 can be inserted into the tube 200 and rotated in the tube 200, thereby the first needle 22 and the second needle 32 can fit closely to the inner wall of the tube 200. The first angle measuring instrument 23 can measure a first angle $\theta 1$ between the second shaft 213 and the first needle 22, and the second angle measuring instrument 33 can measure a second angle $\theta 2$ between the fourth shaft 313 and the third needle 32. The first angle measuring instrument 23 and the second angle measuring instrument 33 can send the first angle $\theta 1$ and the second angle $\theta 2$ to the processing unit 42. The processing unit 42 can read the length L1 of the first connecting shaft 21 and the length L2 of the second connecting shaft L2 of the second connecting shaft 32 from the storage unit 41, and calculate the internal diameter D via the formula: $D=L1\times\sin(180°-\theta 1)+L2\times\sin(180°-\theta 2)$. In at least one embodiment, the processing unit 42 can process a procedure to display a value of the internal diameter D on the display unit 43. In other embodiments, the measuring apparatus 100 can measure an external diameter, or a length of the tube 200. The length L1 of the first connecting shaft 21 can be equal to the length L2 of the second connecting shaft 31.

Figure 5:
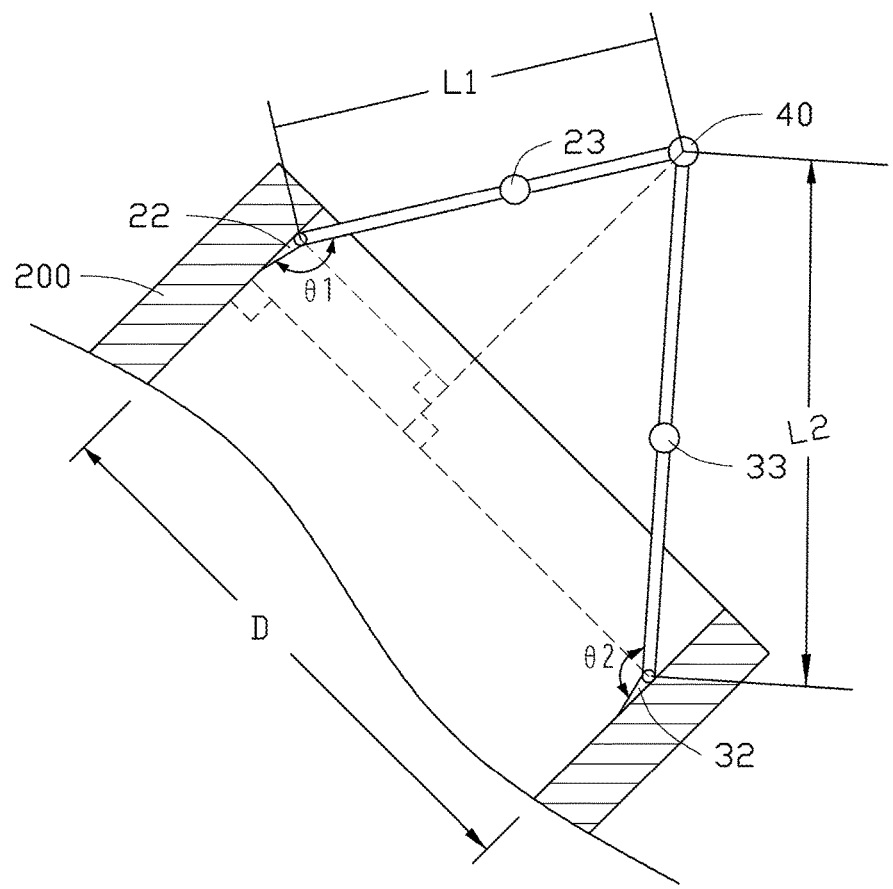
FIG. 5 is another side view of the measuring apparatus shown in FIG. 1 in a second state.

FIG. 5 illustrates that the length L1 of the first connecting shaft 21 can be not equal to the length L2 of the second connecting shaft 31.

In other embodiments, in the initial state, the first needle 22 and the first connecting shaft 21 can be in a straight line and facing two ways, and the second needle 32 and the second connecting shaft 31 can be in a straight line and facing two ways. The processing unit 42 can calculate the internal diameter D via the formula: $D=L1\times\sin(\theta 1)+L2\times\sin(\theta 2)$.

The first angle measuring instrument 23 and the second angle measuring instrument 33 can measure the first angle $\theta 1$ between the first needle 22 and the first connecting shaft 21 and the second angle $\theta 2$ between the second needle 32 and the second connecting shaft 31, and transmit the first angle $\theta 1$ and the second angle $\theta 2$ to the processing unit 42, and the processing unit 42 can calculate the inner diameter D based on the length L1, the length L2, the first angle $\theta 1$, and the second angle $\theta 2$. The inner diameter D can be displayed on the display unit 43. Therefore, the measuring apparatus 100 can accurately measure the inner diameter of the tube 200 without estimated reading the angles.

In other embodiments, the first shaft 211 can be integrated with the second shaft 213, and the first connecting shaft 21 can not be bent. The second connecting shaft 31 can have a same structure with the first connecting shaft 21.

In other embodiments, the first angle measuring instrument 23 can be mounted at a position of the first connecting shaft 21 other than the junction between the first shaft 211 and the second shaft 213. The second angle measuring instrument 33 can be mounted at a position of the second connecting shaft 31 other than the junction between the third shaft 311 and the second shaft 313.

In other embodiments, the first needle 22, the first shaft 211, and the second shaft 213 can be not in a straight line, as long as the second shaft 213 can be rotated to be in a sane plane with the first shaft 211 before the first needle 22 rotates. Similarly, the second needle 32, the third shaft 311, and the fourth shaft 313 can be not in a straight line, as long as the fourth shaft 313 can be rotated to be in a sane plane with the third shaft 311 before the second needle 32 rotates.

In other embodiments, the display module 40, the first angle measuring instrument 23, the second angle measuring instrument 33 can be arranged at one same side of the first connecting shaft 21 and the second connecting shaft 31.

In other embodiments, the first angle measuring instrument 23 can be configured to measure a first rotary angle of the first needle 22, and the second angle measuring instrument 33 can be configured to measure a second rotary angle of the second needle 32. The storage unit 41 can store an angle between the first needle 22 and the first connecting shaft 21 in an initial state, and an angle between the second needle 32 and the second connecting shaft 31 in an initial state. In use, the angle between the first needle 22 and the first connecting shaft 21 can be equal to the sum of the angle stored in the storage unit 41 and the angle read from the first angle measuring instrument 23. The angle between the second needle 32 and the second connecting shaft 31 can be equal to the sum of the angle stored in the storage unit 41 and the angle read from the second angle measuring instrument 33.

Figure 6:
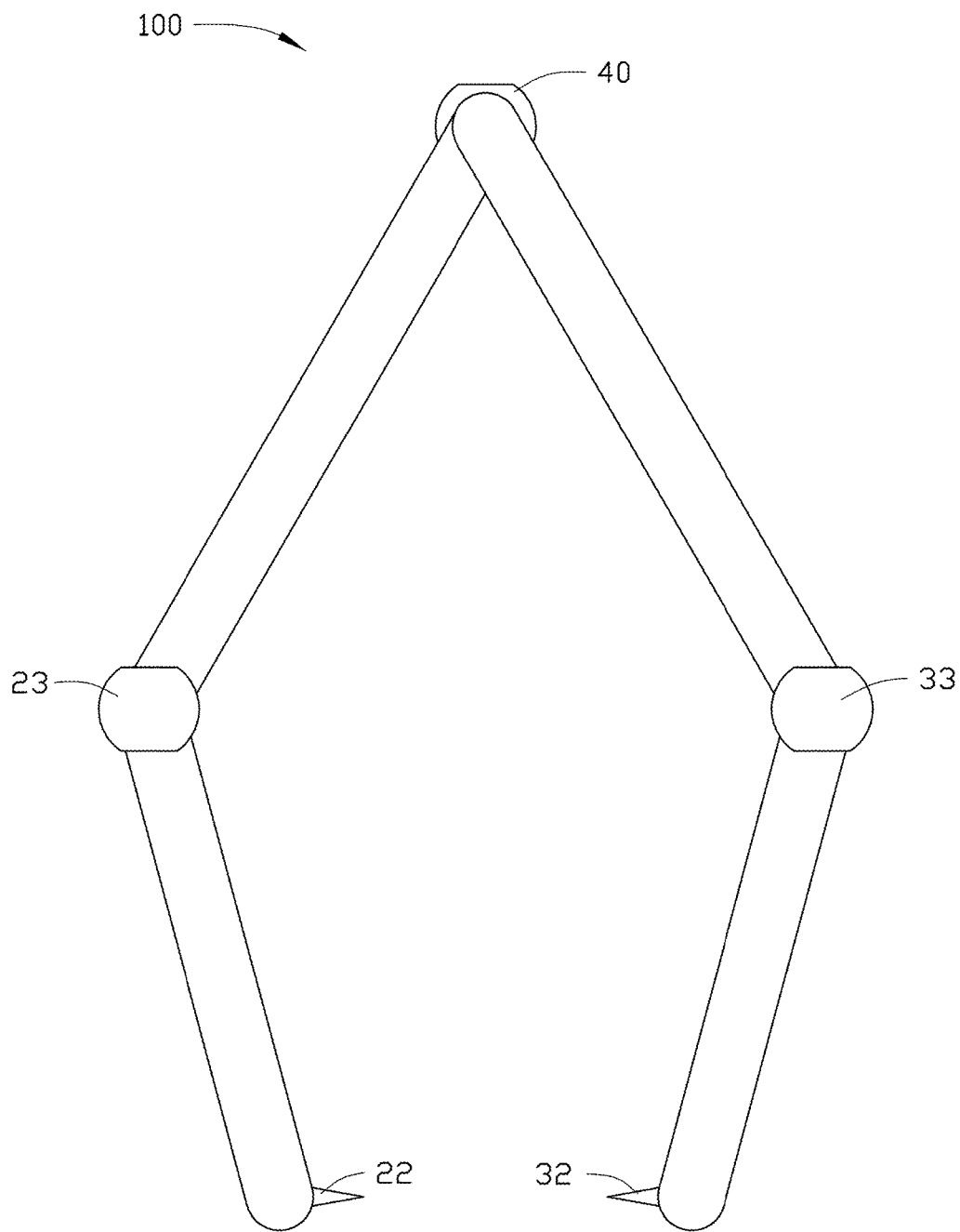
FIG. 6 is an isometric view of a second embodiment of a measuring apparatus.
Figure 7:
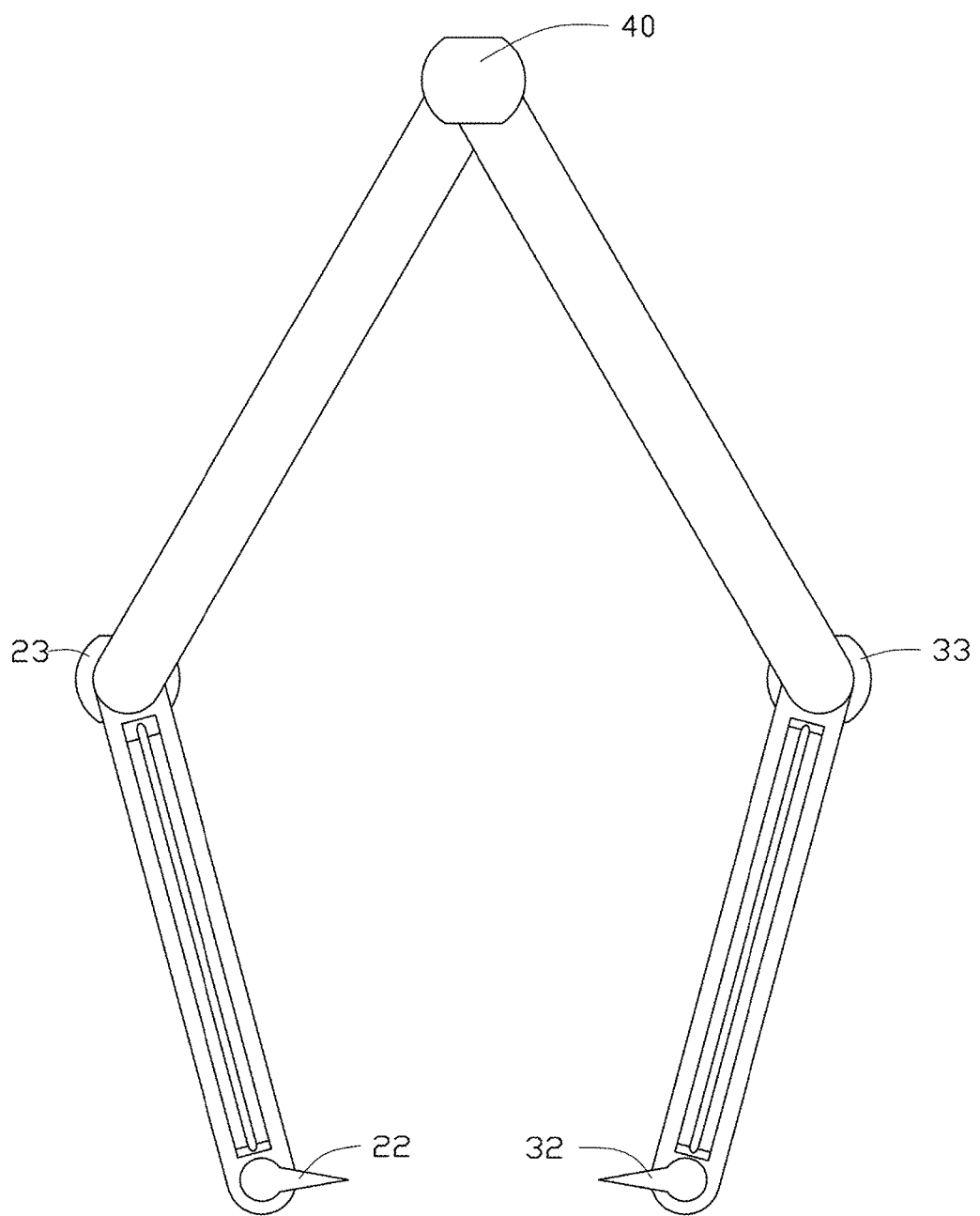
FIG. 7 is similar to FIG. 6, but viewed from another angle.
Figure 8:
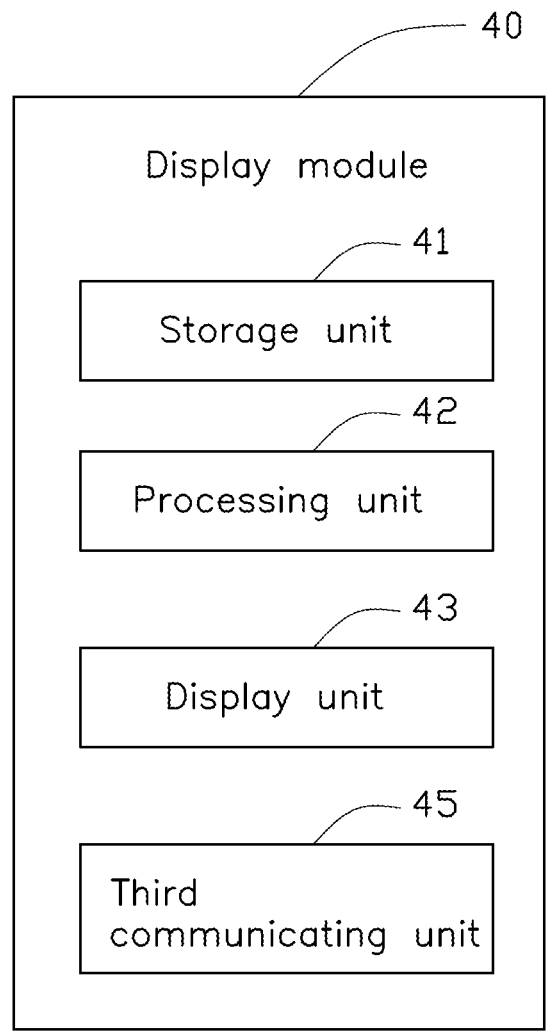
FIG. 8 is a block view of a display module of the measuring apparatus shown in FIG. 6.

FIG. 6 illustrates a measuring apparatus 100 of a second embodiment. The measuring apparatus 100 can include the first angle measuring instrument 23 including a first needle 22 and the second angle measuring instrument 33 including a second needle 32. FIG. 7 illustrates that the first needle 22 can be rotatably mounted at one end of the first angle measuring instrument 23, and the second needle 32 can be rotatably mounted at one end of the second angle measuring instrument 33. The measuring apparatus 100 can be substantially similar with that of the first embodiment, except that, the first angle measuring instrument 23 and the second angle measuring instrument 33 can be in wireless communication with the display module 40. The first angle measuring instrument 23 can include a first communication unit (not shown), and the second angle measuring instrument 33 can include a second communication unit (not shown). FIG. 8 illustrates that the display module 40 can include a third communication unit 45. The third communication unit 45 can be electrically connected to the processing unit 42. The first communicating unit and the second communication unit can transfer data to the third communication unit 45 by wireless communication method, such as Bluetooth, or WIFI. In use, the first angle measuring instrument 23 and the second angle measuring instrument 33 can transmit the angles to the display module 40 by wireless communication method.

The embodiments shown and described above are only examples. Many details are often found in the art such as the other features of a measuring apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A measuring apparatus configured to measure an object, the measuring apparatus comprising:
   a first angle measuring member comprising:
      a first connecting shaft,
      a first needle rotatably connected to the first connecting shaft and configured to contact surfaces of the object, and
      a first angle measuring instrument mounted on the first connecting shaft and electrically connected to the first needle;
   a second angle measuring member comprising:
      a second connecting shaft rotatably connected to the first connecting shaft,
      a second needle rotatably connected to the second connecting shaft and configured to contact surfaces of the object, and
      a second angle measuring instrument mounted on the second connecting shaft and electrically connected to the second needle; and
   a display module mounted on the first angle measuring member or the second angle measuring member and comprising a processing unit and a display unit electrically connected to the processing unit;
   wherein the first angle measuring instrument and the second angle measuring instrument are electrically connected to the display module;
   wherein the first angle measuring instrument is configured to measure a first angle between the first needle and the first connecting shaft and transmit the first angle to the processing unit, and the second angle measuring instrument is configured to measure a second angle between the second needle and the second connecting shaft and transmit the second angle to the processing unit; and
   wherein the processing unit is configured to calculate a size of the object based on the first angle, the second angle, and lengths of the first connecting shaft and the second connecting shaft, and the display unit is configured to display the size of the object calculated by the processing unit.

2. The measuring apparatus as claimed in claim 1, wherein the display module further comprises a storage unit configured to store the lengths of the first connecting shaft and the second connecting shaft.

3. The measuring apparatus as claimed in claim 1,
   wherein the first connecting shaft comprises a first shaft and a second shaft rotatably connected to the first shaft, and the first shaft is rotatably connected to the second connecting shaft; and
   wherein the first needle is rotatably mounted on the second shaft, and the first angle measuring instrument is mounted at junction between the first shaft and the second shaft.

4. The measuring apparatus as claimed in claim 3, wherein the first shaft defines a first slot configured to receive a first electric wire connecting the display module and the first angle measuring instrument, and the second shaft defines a second slot configured to receive a second electric wire connecting the first angle measuring instrument and the first needle.

5. The measuring apparatus as claimed in claim 1,
   wherein the second connecting shaft comprises a third shaft and a fourth shaft rotatably connected to the third shaft, and the third shaft is rotatably connected to the first connecting shaft; and
   wherein the second needle rotatably is connected to the fourth shaft, and the second angle measuring instrument is mounted at junction between the third shaft and the fourth shaft.

6. A measuring apparatus configured to measure an object, the measuring apparatus comprising:
   a first angle measuring member comprising:
      a first connecting shaft,
      a first needle rotatably connected to the first connecting shaft, and
      a first angle measuring instrument mounted on the first connecting shaft and electrically connected to the first needle;
   a second angle measuring member comprising:
      a second connecting shaft rotatably connected to the first connecting shaft,
      a second needle rotatably connected to the second connecting shaft, and
      a second angle measuring instrument mounted on the second connecting shaft and electrically connected to the second needle; and
   a display module mounted on the first angle measuring member or the second angle measuring member and comprising a processing unit and a display unit electrically connected to the processing unit;
   wherein the first angle measuring instrument and the second angle measuring instrument are in wireless connection with the display module;
   wherein the first needle and the second needle are configured to contact surfaces of the object, the first angle measuring instrument is configured to measure a first angle between the first needle and the first connecting shaft and transmit the first angle to the processing unit, and the second angle measuring instrument is configured to measure a second angle between the second needle and the second connecting shaft and transmit the second angle to the processing unit; and wherein the processing unit is configured to calculate a size of the object based on the first angle, the second angle, and lengths of the first connecting shaft and the second connecting shaft, and the display unit is configured to display the size of the object calculated by the processing unit.

7. The measuring apparatus as claimed in claim 6, wherein the display module further comprises a storage unit configured to store the lengths of the first connecting shaft and the second connecting shaft.

8. The measuring apparatus as claimed in claim 6, wherein the first angle measuring instrument comprises a first communication unit, the second angle measuring instrument comprises a second communication unit, and the display module comprises a third communication unit electrically connected to the processing unit; and wherein the first communication unit and the second communication unit transfers data to the third communication unit by wireless communication method.

9. A measuring apparatus configured to measure an object, the measuring apparatus comprising:

a first angle measuring member comprising:
  a first connecting shaft,
  a first needle rotatably connected to the first connecting shaft and configured to contact surfaces of the object, and
  a first angle measuring instrument mounted on the first connecting shaft and electrically connected to the first needle;

a second angle measuring member comprising:
  a second connecting shaft rotatably connected to the first connecting shaft,
  a second needle rotatably connected to the second connecting shaft and configured to contact surfaces of the object, and
  a second angle measuring instrument mounted on the second connecting shaft and electrically connected to the second needle; and a display module mounted on the first angle measuring member or the second angle measuring member and comprising a processing unit and a display unit electrically connected to the processing unit;

wherein the first angle measuring instrument and the second angle measuring instrument are in communication with the display module;

wherein the first angle measuring instrument is configured to measure a first rotary angle of the first needle and transmit the first rotary angle to the processing unit, and the second angle measuring instrument is configured to measure a second rotary angle of the second needle and transmit the second rotary angle to the processing unit; and wherein the processing unit is configured to calculate a size of the object based on the first rotary angle, the second rotary angle, a first angle between the first needle and the first connecting shaft in an initial state, a second angle between the second needle and the second connecting shaft in an initial state, and lengths of the first connecting shaft and the second connecting shaft, and the display unit is configured to display the size of the object calculated by the processing unit.

10. The measuring apparatus as claimed in claim 9, wherein the first angle measuring instrument and the second angle measuring instrument are in wireless connection with the display module.

11. The measuring apparatus as claimed in claim 9, wherein the first angle measuring instrument and the second angle measuring instrument are electrically connected with the display module.

* * * * *